UNITED STATES PATENT OFFICE.

ALFRED HERZHEIM, OF BERLIN, GERMANY, ASSIGNOR TO THE CHEMISCHE FABRIK AUF ACTIEN, VORMALS E. SCHERING, OF SAME PLACE.

WATER AND GREASE PROOF PAPER AND METHOD OF MAKING SAME.

SPECIFICATION forming part of Letters Patent No. 591,968, dated October 19, 1897.

Application filed February 18, 1896. Serial No. 579,768. (No specimens.) Patented in Germany July 27, 1895, No. 86,938; in France December 16, 1895, No. 252,501, and in Belgium December 16, 1895, No. 118,877.

*To all whom it may concern:*

Be it known that I, ALFRED HERZHEIM, a citizen of the German Empire, residing at 170 and 171 Muellerstrasse, Berlin, in the German Empire, have invented certain new and useful Improvements in Water and Grease Proof Papers and Methods of Making the Same, (for which I have obtained Letters Patent of the German Empire, No. 86,938, dated July 27, 1895; Letters Patent of France, No. 252,501, dated December 16, 1895, and Letters Patent of Belgium, No. 118,877, dated December 16, 1895;) and I do hereby declare the following to be a full, clear, and exact description of the invention, such as will enable others skilled in the art to which it appertains to make and use the same.

My invention relates to the manufacture of water and grease proof paper by coating paper containing hydrocellulose with pyroxylin. When paper is converted into parchment-paper by treatment with sulfuric acid and then coated with pyroxylin in the manner heretofore known, the pyroxylin coating or film is not so united with the paper that it resists a prolonged exposure to cold water or moisture and becomes quickly separated from the paper when exposed to warm water.

The object of this invention is to produce a pyroxylin-coated parchment-paper which is practically waterproof and which will retain its coating of pyroxylin even when exposed to warm water or weak acids.

In practicing my invention the hydrocellulose or parchment paper is prepared in any suitable manner—for instance, by treatment with sulfuric acid. This paper is then exposed to the action of a bath of dilute cuprammonium, a three to five per cent. solution being suitable. The paper is preferably washed after removal from the bath of cuprammonium, whereby the ammonia is removed while copper oxid remains. The paper is then drawn through or immersed in or otherwise coated with a solution of pyroxylin in any suitable solvent—for instance, in acetic ether, a mixture of ether and alcohol, methyl alcohol, or acetone and alcohol. The solvent is evaporated and may be recovered by condensation and be used again. The cuprammonium loosens or softens the hydrocellulose of the paper and imparts to the same a more or less spongy or porous character, which prepares the paper for the reception of the pyroxylin coating. The pyroxylin enters the loosened or softened surface portion of the hydrocellulose-paper and unites or combines with the same so intimately or thoroughly that it becomes permanently united with the paper and effectually resists the action of warm as well as cold water. Paper prepared as above described is insoluble in water and weak acids, is impermeable to grease, water, and air, and is therefore useful for many different purposes—for instance, in photography, for packing butter, margarin, grease, materials containing acids, munitions of war, &c.

I claim as my invention—

1. The herein-described method of producing waterproof paper which consists in treating hydrocellulose-paper with cuprammonium and afterward with a solution of pyroxylin, substantially as set forth.

2. The herein-described waterproof paper consisting of a body of parchment-paper impregnated with copper oxid and a coating of pyroxylin permanently united with said body, substantially as set forth.

In testimony whereof I have signed my name, in the presence of two subscribing witnesses, this 30th day of January, 1896.

ALFRED HERZHEIM.

Witnesses:
  W. HAUPT,
  CHARLES H. DAY.